United States Patent
Worrell (10) Patent No.: US 6,728,816 B1
(45) Date of Patent: Apr. 27, 2004

(54) SIMPLE MECHANISM FOR GUARANTEEING IN ORDER READ DATA RETURN ON A SPLIT TRANSACTION BUS

(75) Inventor: Frank Worrell, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 457 days.

(21) Appl. No.: 09/780,061

(22) Filed: Feb. 9, 2001

(51) Int. Cl.[7] .................. G06F 13/00; G06F 15/177
(52) U.S. Cl. .................. 710/305; 709/101; 713/202
(58) Field of Search .................. 710/305, 100, 710/107, 110; 709/101, 102; 340/825.52; 370/464; 713/202

(56) References Cited

U.S. PATENT DOCUMENTS 4,320,387 A * 3/1982 Powell
5,590,374 A * 12/1996 Shariff et al.
6,349,345 B1 * 2/2002 Sims, III et al.

* cited by examiner

Primary Examiner—Gopal C. Ray
(74) Attorney, Agent, or Firm—Christopher P. Maiorana PC (57) ABSTRACT

A circuit that may be used with a split transaction bus. The circuit generally comprises a register logic and a compare logic. The register logic may be configured to (i) present a first identification signal associated with a first slave device to perform a first transaction and (ii) store a second identification signal associated with a second slave device in place of the first identification signal responsive to a ready signal presented by the second slave device. The compare logic may be configured to (i) compare the second identification signal with the first identification signal and (ii) present a back off signal responsive to the compare.

21 Claims, 6 Drawing Sheets

FIG._7

SIMPLE MECHANISM FOR GUARANTEEING IN ORDER READ DATA RETURN ON A SPLIT TRANSACTION BUS

FIELD OF THE INVENTION

The present invention relates to a method and/or architecture for a split transaction bus generally and, more particularly, to a simple mechanism for guaranteeing in-order read data returns on a split transaction bus.

BACKGROUND OF THE INVENTION

A master device, such as a central processing unit, on a split transaction capable bus may request read data items from multiple slave devices on the bus. Because the slave devices may have different read latencies, the read data items can return to the master device out-of-order (i.e. the read data items return in a different order than the read requests). If the master device can have multiple read requests outstanding, there must be some method for handling out-of-order read returns. Current approaches require that the master device keeps track of all outstanding read requests, have some way of identifying which read goes with which request, and some mechanism for reordering the read data items.

The current approaches require a great deal of complexity to deal with a situation that does not occur often in many systems. Most reads are to a single slave device, such as a dynamic random access memory controller, with occasional reads from input/output (I/O) devices. High performance I/O can be handled by a separate direct memory access (DMA) controller or separate channels of a single DMA controller that moves data between a single I/O device and memory.

SUMMARY OF THE INVENTION

The present invention concerns a circuit that may be used with a split transaction bus. The circuit generally comprises a register logic and a compare logic. The register logic may be configured to (i) present a first identification signal associated with a first slave device to perform a first transaction and (ii) store a second identification signal associated with a second slave device in place of the first identification signal responsive to a ready signal presented by the second slave device. The compare logic may be configured to (i) compare the second identification signal with the first identification signal and (ii) present a back off signal responsive to the compare.

The objects, features and advantages of the present invention include providing a method and/or architecture for a circuit that (i) may guarantee that read data items return in-order and/or (ii) may cause both the master device and the slave device to ignore transactions that may cause read data items to return out-or-order on a split transaction bus.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
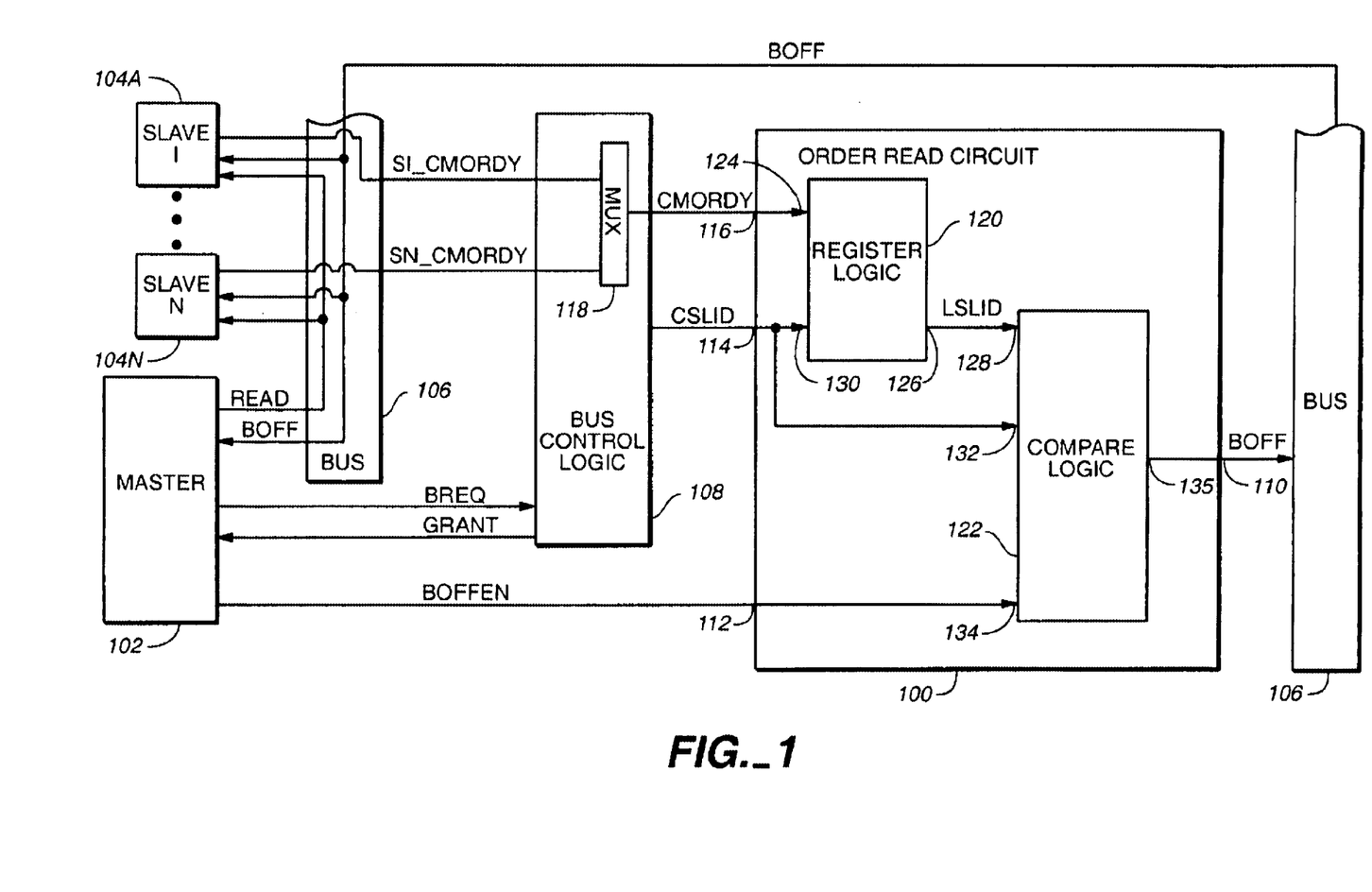
FIG. 1 is a block diagram of a circuit illustrating an embodiment of the present invention.

Referring to FIG. 1, a block diagram of an order read circuit 100 is shown in accordance with an embodiment of the present invention. The order read circuit 100 generally operates with a master device 102 and one or more slave devices 104A–N on a bus 106. The order read circuit 100 may also operate with a bus control logic 108 that generally controls a flow of commands and data on the bus 106. In an alternative embodiment, the order read circuit 100 may be incorporated into the bus control logic 108.

The order read circuit 100 may have an output 110 that may present a signal (e.g., BOFF) on the bus 106. The signal BOFF may serve as a back off signal. The signal BOFF is generally monitored by the master device 102 and the slave devices. 104A–N via the bus 106. The order read circuit 100 generally has an input 112 that may receive a signal (e.g., BOFFEN) presented by the master circuit 102. The signal BOFFEN may serve as a back off enabling signal. The order read circuit 100 may have inputs 114 and 116 that may receive a signal (e.g., CSLID) and another signal (e.g., CMDRDY) respectively from the bus control logic 108. The signal CSLID may serve as a current slave identification signal. The signal CMDRDY may serve as a command ready signal.

The bus control logic 108 may exchange multiple signals with the master 102 to request/grant bus control and to initiate read transactions with the slave devices 104A–N. The master 102 may request bus mastership by presenting a signal (e.g., BREQ) to the bus control logic 108. The signal BREQ may serve as a bus request signal. The bus control logic 108 may grant bus mastership to the master 102 by presenting a signal (e.g., GRANT) back to the master 102. The signal GRANT may serve as a bus grant signal. The master 102 may initiate a read transaction by presenting a signal (e.g., READ) to a selected slave device 104X (where X may range from A to N) via the bus 106. The signal READ may serve as a read request signal or a read request command. The selected slave device 104X may present a signal (e.g., SX_CMDRDY) to the bus control logic 108 in response to the signal READ. The prefix "SX" generally identifies slave number X as the source of the signal SX_CMDRDY.

The bus control logic 108 may produce the signal CMDRDY based upon multiple command ready signals (e.g., S1_CMDRDY to SN_CMDRDY) received from the slave devices 104A–N. A multiplexer 118 within the bus control logic 108 generally multiplexes the signals S1_CMDRDY through SN_CMDRDY to present the signal CMDRDY. For example, the multiplexer 118 may multiplex the signal SX_CMDRDY presented by the selected slave device 104X to present the signal CMDRDY.

The order read circuit 100 may comprise a register logic 120 and a compare logic 122. The register logic 120 generally has an input 124 for receiving the signal CMDRDY. The register logic 120 may have an output 126 to present a signal (e.g., LSLID) to an input 128 of the compare logic 122. The signal LSLID may serve as a last slave device identification signal. The signal CSLID may be received at an input 130 of the register logic 120 and at an input 132 of the compare logic 122. The compare logic 122 may also have an input 134 to receive the signal BOFFEN and an output 135 to present the signal BOFF.

Figure 2:
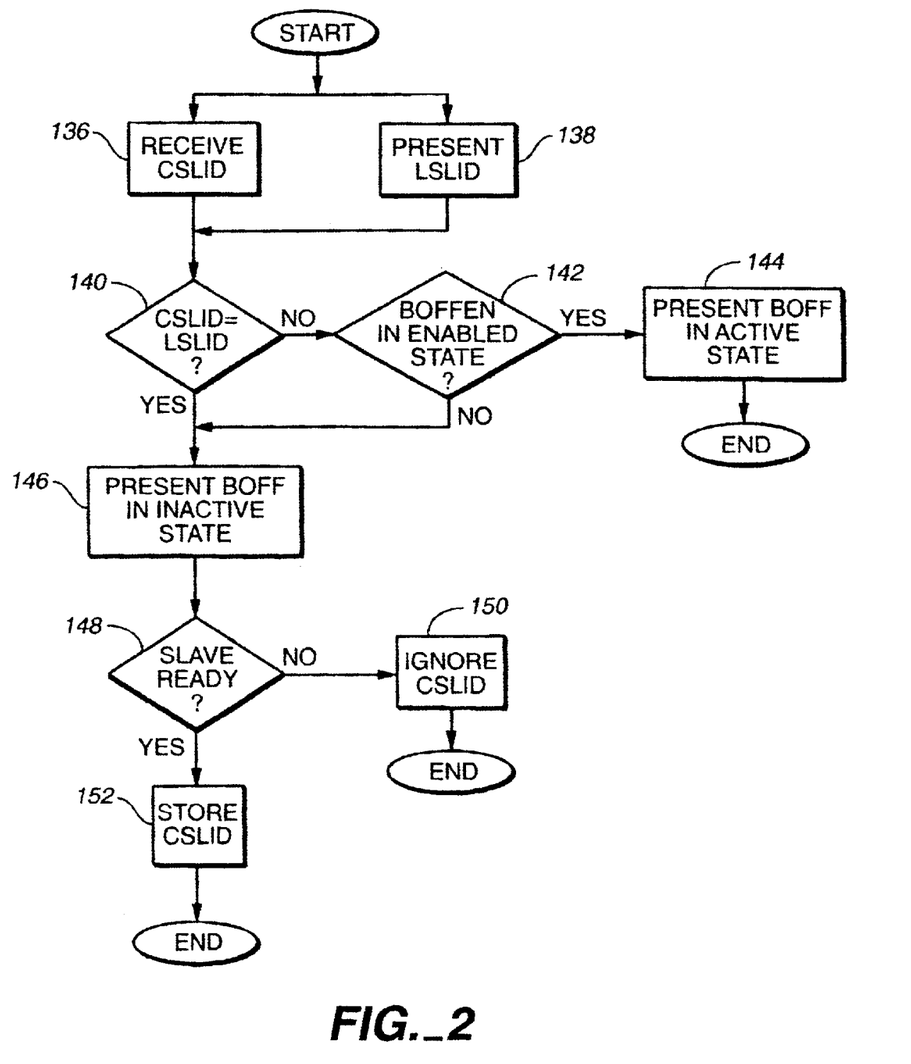
FIG. 2 is a flow diagram of a process for operating the circuit.

Referring to FIG. 2, a flow diagram of a process for operating the order read circuit 100 of FIG. 1 is shown. The process starts with the read order circuit 100 receiving the signal CSLID from the bus control logic 108 (e.g., block 136). The signal CSLID identifies a current slave device 104Y (where Y may range from A to N) involved in a current read transaction that may be initiated by the master device 102. For example, the signal CSLID may serve as an address of the current slave device 104Y on the bus 106. Before, during, and after receiving the signal CSLID, the register logic 120 presents the signal LSLID (e.g., block 138) to the compare logic 122. The signal LSLID identifies a most recent, or last slave device 104Z (where Z may range from A to N) that acknowledged the signal READ presented by the master device 102. Here too, the signal LSLID may serve as an address of the last slave device 104Z.

The signal CSLID and the signal LSLID are then compared (e.g., block 140) to determine if the current slave device 104Y is different than that last slave device 104Z. If the signal CSLID does not match the signal LSLID (e.g., the NO branch of decision block 140), then a state of the signal BOFFEN is checked (e.g., decision block 142). If the signal BOFFEN is in an enabled state (e.g., the YES branch of decision block 142), then the compare logic 122 presents the signal BOFF in an active state (e.g., block 144). The master device 102 and the slave devices 104A–N may monitor the signal BOFF continuously. When the signal BOFF is in the active state, the master device 102 and the current slave device 104Y must ignore the current read transaction that the master device 102 has just commanded.

If the signal CSLID matches the signal LSLID (e.g., the YES branch of decision block 140), then the master device 102 is initiating the current read transaction with the last slave device 104Z (e.g., Y=Z). Here, the current read transaction may be allowed to overlap the last read transaction because the current slave device 104Y generally responds with the read data items for the overlapping read transactions in-order. Consequently, the compare logic 122 may present the signal BOFF in an inactive state (e.g., block 146) to allow the current read transaction to proceed.

Another situation that may occur is that the master device 102 has completed the last read transaction to the last slave device 104Z and is starting the current read transaction to the current slave device 104Y which may be different than the last slave device 104Z. Here, the signal CSLID may not match the signal LSLID (e.g., the NO branch of decision block 140). From this point, the master device 102 may present the signal BOFFEN in a disabled state (e.g., the NO branch of decision block 142) to force the signal BOFF to the inactive state (e.g., block 146). Since the current slave device 104Y receives the signal BOFF in the inactive state, then the current slave device 104Y may respond to the current read transaction command.

The current slave device 104Y may indicate that it is not prepared for the current read transaction by presenting the signal SY_CMDRDY in a not-ready state. If the current slave device 104Y is not ready (e.g., the NO branch of decision block 148), then the bus control logic 108 generally presents the signal CMDRDY in a not-ready state. The register logic 122 may respond to the signal CMDRDY in the not-ready state by ignoring the signal CSLID (e.g., block 150).

If the current slave device 104Y is ready for the current read transaction (e.g., the YES branch of decision block 148), then the current slave device 104Y may present the signal SY_CMDRDY in a ready state. The bus control logic 108 generally presents the signal CMDRDY in a ready state in response to receiving the signal SY_CMDRDY in the ready state. The register logic 120, in turn, may respond to the signal CMDRDY in the ready state by storing the signal CSLID (e.g., block 152). Storing the signal CSLID in the register logic 120 generally causes the last slave identification to be replaced by the current slave identification. For example, the signal LSLID may be set equal to the signal CSLID.

Figure 3:
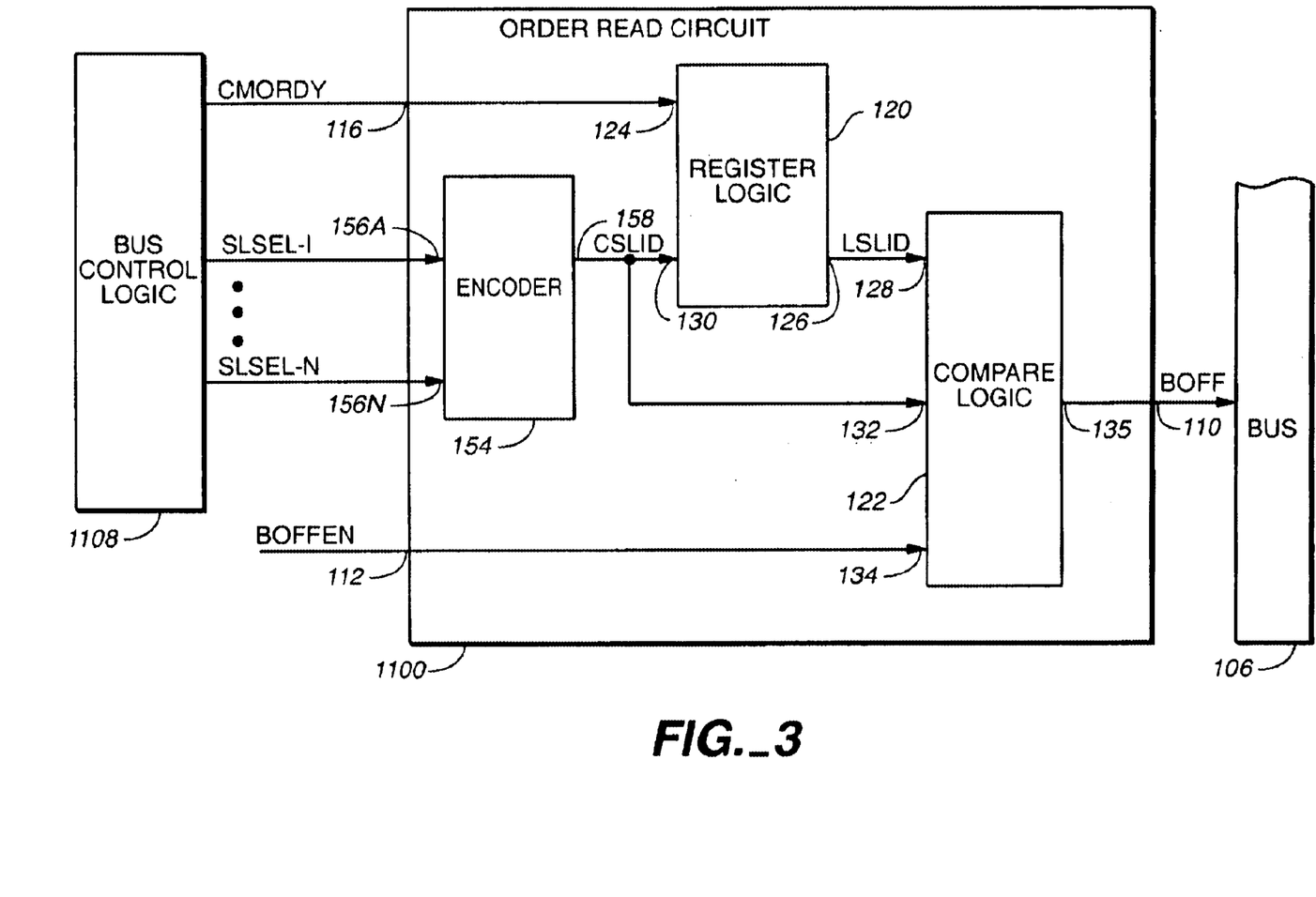
FIG. 3 is a block diagram of an alternative embodiment of the circuit.

Referring to FIG. 3, a block diagram of an alternative embodiment of the present invention is shown. This embodiment may be employed where a bus control logic 1108 may generate multiple signals (e.g., SLSEL_1 through SLSEL_N), one associated with each of the slave devices 104A–N. The signals SLSEL_1 through SLSEL_N may serve as slave select signals. The bus control logic 1108 generally presents the signals SLSEL_1 through SLSEL_N to identify which of the slave devices 104A–N may be involved in the current read transaction.

The order read circuit 1100 may include an encoder 154 to convert the signals SLSEL_1 through SLSEL_N into the signal CSLID. The encoder 154 generally has multiple inputs 156A–N for receiving the signals SLSEL_1 through SLSEL_N respectively. The encoder 154 may have an output 158 that may present the signal CSLID to the register logic 120 and the compare logic 122.

Generally, the encoder 154 may minimize a number of bits required to identify each slave device 104A–N. For example, if the slave devices 104A–N are identified by their addresses, and the bus 106 has a thirty-two bit address range, then the signal CSLID may have a thirty-two bit width. In contrast, if the N slave devices 104A–N are represented by a unique binary number, then the signal CSLID may have only a log2 (N) bit width. The encoder 154 also allows the slave devices 104A–N to be identified in a particular order. Identification, for example, may be arranged by increased latency.

Figure 4:
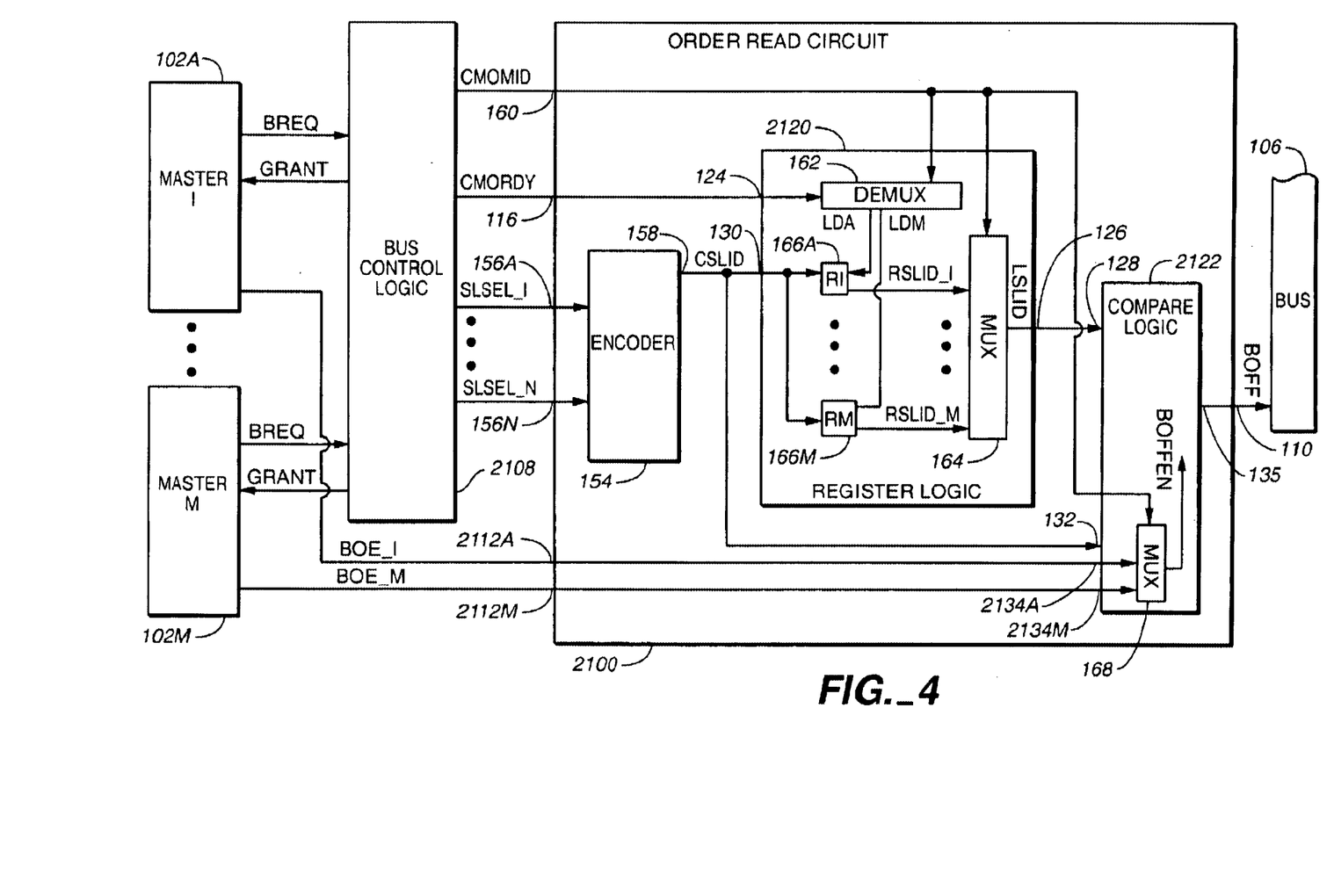
FIG. 4 is a block diagram of a preferred embodiment of the circuit.

Referring to FIG. 4, a detailed block diagram of a preferred embodiment of the present invention is shown. Here, an order read circuit 2100 may be designed to operate with multiple master devices 102A–M. The bus control logic 2108 generally arbitrates among the master devices 102A–M to determine which master device 102A–M has control of the bus 106. The bus control logic 2108 may present a signal (e.g., CMDMID) to an input 160 of the order read circuit 2100. The signal CMDMID may serve as a command master identification signal. The signal CMDMID may identify which of the masters devices 102A–M may be performing the current read transaction. Each of the master devices 102A–M may present a separate signal (e.g., BOE_1 through BOE_M) to inputs 2112A–M respectively of the order read circuit 2100. The signals BOE_1 through BOE_M may serve as back off enable signals. Each signal BOE_1 through BOE_M may come from the master devices 102A–M respectively in FIG. 4 as the signal BOFFEN may come from the master device 102 in FIG. 1.

The register logic 2120 generally comprises a demultiplexer 162, a multiplexer 164, and multiple registers 166A–M. Generally, there is one register 166A–M for each master device 102A–M. Each of the registers 166A–M may receive the signal CSLID from the encoder 154 and a signal (e.g., LDA through LDM) from the demultiplexer 162. The signals LDA through LDM may serve as load signals. The registers 166A–M may present a signal (e.g., RSLID_1 through RSLID_M respectively) to the multiplexer 164. The signals RSLID_1 through RSLID_M may serve as registered slave identification signals.

The register logic 2120 may present the signal LSLID as the last slave identification associated with the current master device 102Y that may have bus mastership. The register logic 2120 generally uses the signal CMDMID to identify the current master device 102Y. The multiplexer 164 may multiplex the appropriate signal RSLID_Y into the signal LSLID based upon the signal CMDMID.

The register logic 2120 may store the signal CSLID for the current slave identification associated with the current master device 102Y. The signal CSLID may be stored in the appropriate register 166Y as determined by the signal CMD-MID. The demultiplexer 162 generally demultiplexes the signal CMDRDY into an appropriate signal LDY. The appropriate signal LDY generally causes the associated register 166Y to store the signal CSLID.

The compare logic 2122 for a preferred embodiment may include a multiplexer 168. The multiplexer 168 generally provides for multiplexing of the signals BOE_1 through BOE_M into the signal BOFFEN based upon the signal CMDMID. The signal BOFFEN may then be used internally by the compare logic 2122 for enabling and disabling the signal BOFF.

Figure 5:
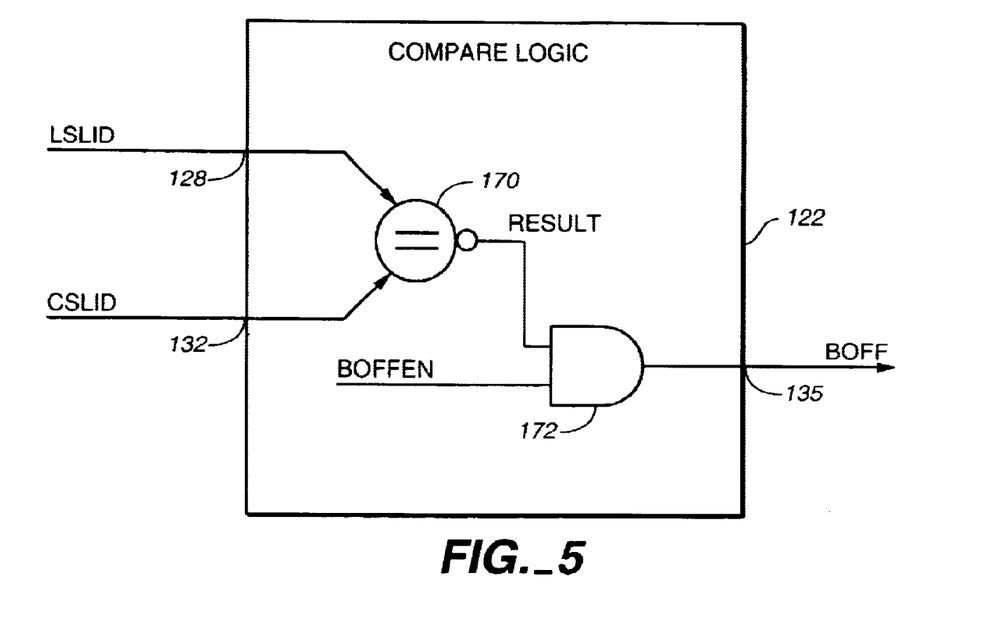
FIG. 5 is a detailed block diagram of a portion of the circuit.

Referring to FIG. 5, a block diagram of a first embodiment of the compare logic 122 is shown. The compare logic 122 may comprise a comparison circuit 170 and a logic gate 172. The comparison circuit 170 generally compares the signal LSLID with the signal CSLID to present a signal (e.g., RESULT). The signal RESULT may serve as a result signal. The comparison circuit 170 may be configured to present the signal RESULT in a match state when the signal LSLID is the same as the signal CSLID. The match state may indicate that the current slave device 104Y is the same as the last slave device 104Z. The match state may be implemented as a logical low or "0" value. The comparison circuit 170 may be configured to present the signal RESULT in a non-match state when the signal LSLID is not the same as the signal CSLID. The non-match state may indicate that the current slave device 104Y is not the same as the last slave device 104Z. The non-match state may be implemented as a logical high or "1" value.

The logical gate 172 generally presents the signal BOFF as the signal RESULT enabled/disabled by the signal BOFFEN. In a preferred embodiment, the logical gate 172 may be implemented as a logical AND gate. The signal BOFF is generally presented in the active state (e.g., logical "1") when the signal RESULT is in the non-match state (e.g., logical "1") and the signal BOFFEN is in the enabled state (e.g., logical "1"). The signal BOFF may be presented in the inactive state (e.g., logical "0") when the signal RESULT is in the match state (e.g., logical "0") and/or the signal BOFFEN is in the disabled state (e.g., logical "0").

Figure 6:
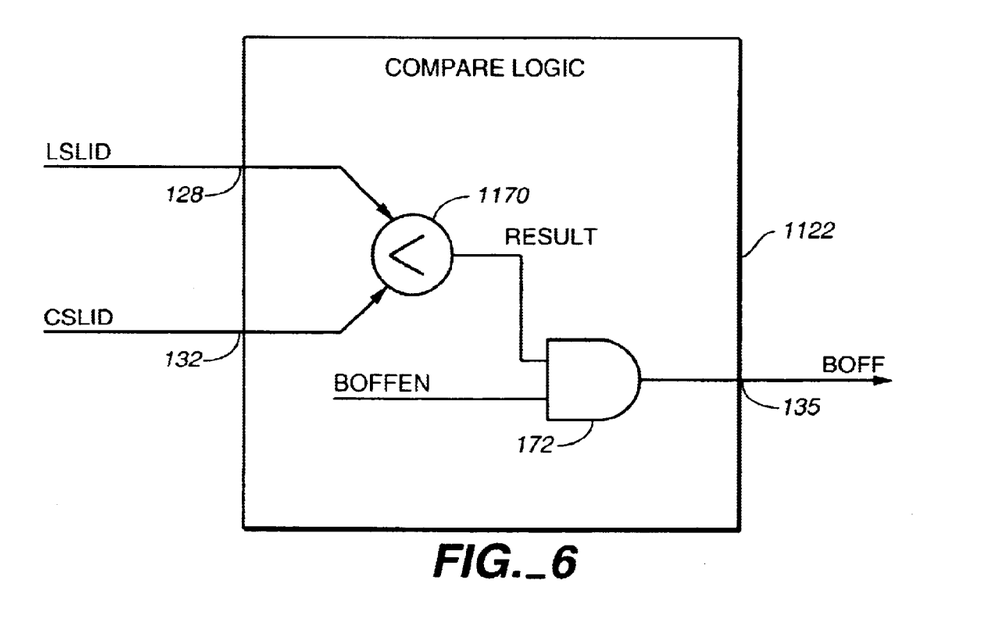
FIG. 6 is a detailed block diagram of an alternative embodiment of the portion of the circuit.

Referring to FIG. 6, a block diagram of another embodiment of the compare logic 1122 is shown. Here, a compare circuit 1170 may be implemented as a compare less-than function. The compare circuit 1170 may present the signal RESULT in a less-than state when a value of the signal CSLID is less than a value of the signal LSLID. The less-than state may indicate that the current read transaction to the current slave device 104Y may be faster than the last read transaction to the last slave device 104Z. The less-than state may be implemented as a logical high or "1" state. The compare circuit 1170 may present the signal RESULT in a greater-than-or-equal-to state when the value of the signal CSLID is greater than or equal to the value of the signal LSLID. The greater-than-or-equal-to state may indicate that the current read transaction to the current slave device 104Y may be as slow or slower than the last read transition to the last slave device 104Z. The greater-than-or-equal-to state may be implemented as a logical low or "0" state.

The signal RESULT may be presented to the logical gate 172. The logical gate 172 may present the signal BOFF in the active state (e.g., logical "1") when the signal RESULT is in the less-than state (e.g., logical "1") and the signal BOFFEN is in the enabled state (e.g., logical "1"). The signal BOFF may be presented in the inactive state (e.g., logical "0") when the signal RESULT is in the greater-than-or-equal-to state (e.g., logical "0") and/or the signal BOFFEN is in the disabled state (e.g., logical "0").

Figure 7:
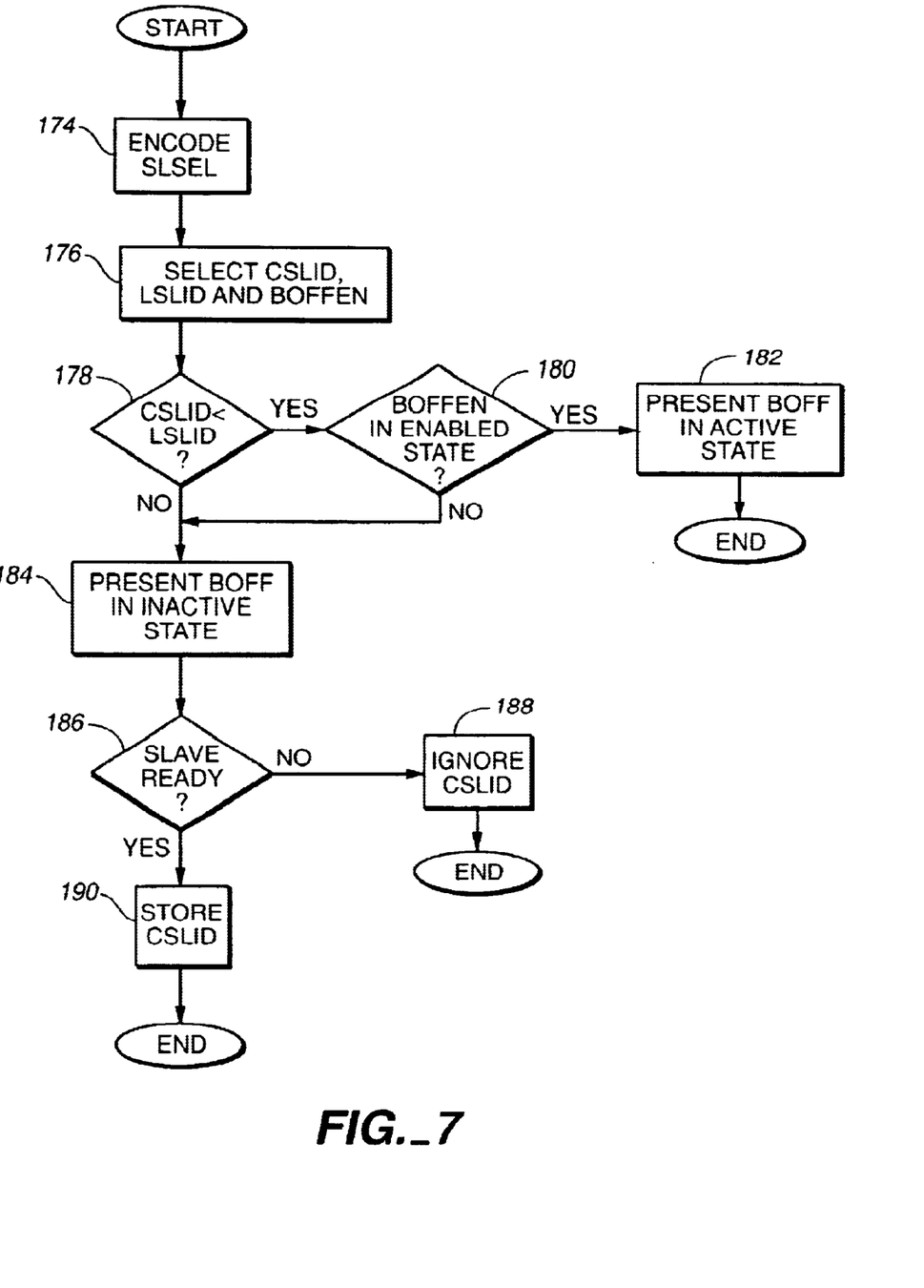
FIG. 7 is a flow diagram of a process for operating the circuit accounting for the alternative embodiment of the portion.

Referring to FIG. 7, a flow diagram of a process for operating the order read circuit 2100 with the compare logic 1122 is shown. The encoder 154 generally encodes the signals SLSEL_1 through SLSEL_N into the signal CSLID (e.g., block 174). The encoding of the signal SLSEL_1 through SLSEL_N may be performed in an increasing latency fashion. Slave devices 104A–N having slow response latencies may be identified with large latency values. Slave devices 104A–N having fast response latencies may be identified with small latency values. The latency values may be encoded into the signal CSLID. Slave devices 104A–N having an identical response latency may be identified with the same latency value within the signal CSLID. In such an implementation, the compare circuit 1170 may ignore one or more least significant bits of the signal CSLID and the signal LSLID when comparing the signal CSLID with the signal LSLID. Alternatively, each slave device 104A–N may be identified with a unique latency value for the signal CSLID.

The signal CSLID may be selected from among the signals SLSEL_1 through SLSEL_N (e.g., block 176) based upon the signals SLSEL_1 through SLSEL_N. The signal LSLID may be selected from among the signals RSLID_1 through RSLID_M (e.g., block 176) based upon the signal CMDMID. The signal BOFFEN may be selected from among the signals BOE_1 through BOE_M (e.g., block 176) based upon the signal CMDMID.

The signal CSLID may be compared with the signal LSLID by the compare circuit 1170 (e.g., block 178). If the latency value encoded within the signal CSLID is less than the latency value encoded within the signal LSLID (e.g., the YES branch of decision block 178) then the response time of the current slave device 104Y may be faster than the response time for the last slave device 104Z. The read transaction to the current slave device 104Y generally should not be attempted because the last slave device 104Z may respond out-of-order after the current slave device 104Y responds.

The state of the signal BOFFEN may be checked to determine if the current master 102Y commands an override of the signal BOFF (e.g., decision block 180). If the signal BOE_Y, and thus the signal BOFFEN, is in the enabled state (e.g., the YES branch of decision block 180), then the signal BOFF may be presented in the active state (e.g., block 182) to back-off or ignore the current read transaction. If the signal BOE_Y, and thus the signal BOFFEN, is in the disabled state (e.g., the NO branch of decision block 180), then the signal BOFF may be presented in the inactive state (e.g., block 184) to allow the current read transaction to continue.

If the signal CSLID is not less than the signal LSLID (e.g., the NO branch of decision block 178), then the signal BOFF may be presented in the inactive state (e.g., block 184). Here, the response time of the current slave device 104Y may be slower than the response time of the last slave device 104Z or the response time of the current slave device 104Y may be the same as the last slave device 104Z. If the current read transaction is as slow or slower than the last read transaction, then the last read transaction generally completes in-order before the current read transaction. Consequently, both the current read transaction and the last read transaction may be allowed to be outstanding simultaneously. Where the current read transaction is to the last slave device 104Z, then the last slave device 104Z is generally assumed to be capable of handling overlapping back-to-back transactions with the current master 102Y.

In situations where the signal BOFF is presented in the disabled state, then the status of the current slave device 104Y is checked (e.g., decision block 186). If the current slave device 104Y is not ready for the current read transaction (e.g., the NO branch of decision block 186), then the signal CSLID may be ignored by the register logic 2120 (e.g., block 188). If the current slave device 104Y is ready for the current read transaction (e.g., the YES branch of decision block 186), then the signal CSLID may be stored in the appropriate register 166Y of the register logic 2120.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a register logic configured to (i) present a first identification signal associated with a first slave device to perform a first transaction and (ii) store a second identification signal associated with a second slave device in place of said first identification signal responsive to a ready signal presented by said second slave device; and
   a compare logic configured to (i) compare said second identification signal with said first identification signal before said store of said second identification signal and (ii) present a back off signal in an active state to cause a second transaction involving said second slave device to be ignored in response to said compare determining that said second identification signal is unequal to said first identification signal.

2. The circuit according to claim 1, wherein said compare logic is further configured to present said back off signal responsive to an enable signal presented by a master device.

3. The circuit according to claim 1, further comprising:
   an encoder logic configured to present said second identification signal responsive to a plurality of select signals that identify said second slave device.

4. The circuit according to claim 3, wherein said register logic is further configured to present a first latency value encoded within said first identification signal.

5. The circuit according to claim 4, wherein said encoder logic is further configured to present a second latency value encoded within said second identification signal.

6. The circuit according to claim 5, wherein said compare logic is further configured to present said back off signal responsive to said first latency value and said second latency value.

7. The circuit according to claim 1, wherein said compare logic comprises:
   a comparator configured to present a result signal responsive to said first identification signal and said second identification signal; and
   a logic gate configured to present said back off signal responsive to said result signal and an enable signal presented by a master device.

8. The circuit according to claim 1, wherein said register logic comprises:
   a plurality of registers configured to (i) present a plurality of third identification signals respectively, and (ii) store said second identification signal responsive to a plurality of load signals;
   a multiplexer configured to present said first identification signal multiplexed from said plurality of third identification signals; and
   a demultiplexer configured to present said plurality of load signals demultiplexed from said ready signal.

9. The circuit according to claim 8, wherein said compare logic is further configured to present said enable signal multiplexed from a plurality of second enable signals presented by a plurality of master devices respectively.

10. The circuit according to claim 9, further comprising:
    an encoder logic configured to present said second identification signal responsive to a plurality of select signals that identify said second slave device.

11. The circuit according to claim 1, wherein said first transaction is a read transaction initiated by a master device on a split transaction bus.

12. A method of controlling transactions on a split transaction bus, the method comprising the steps of:
    (A) presenting a first identification signal associated with a first slave device to perform a first transaction;
    (B) comparing a second identification signal associated with a second slave device with said first identification signal;
    (C) presenting a back off signal in an active state to cause a second transaction involving said second slave device to be ignored in response to step (B) determining that said second identification signal is unequal to said first identification signal; and
    (D) storing said second identification signal in place of said first identification signal after step (B) in response to a ready signal presented by said second slave device.

13. The method according to claim 12, wherein step (C) is further responsive to an enable signal presented by a master device.

14. The method according to claim 12, further comprising the step of:
    encoding a plurality of select signals that identify said second slave device to present said second identification signal prior to step (B).

15. The method according to claim 14, further comprising the step of:

presenting a first latency value encoded within said first identification signal prior to step (B).

16. The method according to claim 15, further comprising the step of:

encoding a second latency value within said second identification signal prior to step (B).

17. The method according to claim 16, wherein step (C) is further responsive to said first latency value and said second latency value.

18. The method according to claim 12, wherein said step (A) further comprises the sub-steps of:

presenting a plurality of third identification signals; and multiplexing said plurality of third identification signals to present said first identification signal in response to presenting said plurality of third identification signals.

19. The method according to claim 18, further comprising the steps of:

demultiplexing said ready signal to present a plurality of load signals; and storing said second identification signal in response to presenting said plurality of load signals.

20. The method according to claim 19, further comprising the step of:

multiplexing a plurality of second enable signals received from a plurality of master devices respectively to present said enable signal.

21. A circuit comprising:

means for presenting a first identification signal associated with a first slave device to perform a first transaction;

means for comparing a second identification signal associated with a second slave device with said first identification signal;

means for presenting a back off signal in an active state to cause a second transaction involving said second slave device to be ignored in response to said means for comparing determining that said second identification signal is unequal to said first identification signal; and means for storing said second identification signal in place of said first identification signal after said comparing in response to a ready signal presented by said second slave device.

* * * * *